(12) United States Patent
Oh (10) Patent No.: US 9,756,385 B1
(45) Date of Patent: Sep. 5, 2017

(54) SOURCE DEVICE AND METHOD OF TRANSMITTING CONTENT

(71) Applicant: SAMSUNG ELECTRONICS CO., LTD., Suwon-si, Gyeonggi-do (KR)

(72) Inventor: Sung-bo Oh, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/208,859

(22) Filed: Jul. 13, 2016

Related U.S. Application Data

(60) Provisional application No. 62/295,611, filed on Feb. 16, 2016.

(30) Foreign Application Priority Data

Apr. 15, 2016 (KR) .................. 10-2016-0046494

(51) Int. Cl.
| | |
|---|---|
| *H04N 7/18* | (2006.01) |
| *H04N 21/4402* | (2011.01) |
| *H04N 21/2343* | (2011.01) |
| *H04N 21/2347* | (2011.01) |
| *H04N 21/4408* | (2011.01) |

(52) U.S. Cl.
CPC ..... *H04N 21/4402* (2013.01); *H04N 21/2343* (2013.01); *H04N 21/2347* (2013.01); *H04N 21/4408* (2013.01)

(58) Field of Classification Search
None
See application file for complete search history.

(56) References Cited

U.S. PATENT DOCUMENTS

| | | | |
|---|---|---|---|
| 9,462,308 B2* | 10/2016 | LaBosco | H04N 21/43635 |
| 2011/0129087 A1* | 6/2011 | Zhang | G06F 21/10 |
| | | | 380/44 |

(Continued)

FOREIGN PATENT DOCUMENTS

| | | |
|---|---|---|
| KR | 10-2008-0056539 | 6/2008 |
| KR | 10-1485790 | 1/2015 |

OTHER PUBLICATIONS

"Introduction to HDCP 2.2", *Extron Electronics*, Sep. 8, 2015, 10 pages.

*Primary Examiner* — Fernando Alcon
(74) *Attorney, Agent, or Firm* — Nixon & Vanderhye, P.C.

(57) ABSTRACT

A source device and a method of transmitting content are provided. The source device includes a controller configured to check a version of a content protection method supported by a sink device from the repeater, to encrypt the content based on a version of the content protection method applied to the content, and to set a value of type information of the content protection method based on the version of the content protection method applied to the content and the version of the content protection method supported by the sink device, and a communicator including communication circuitry configured to transmit the encrypted content and the type information of the content protection method to the repeater, wherein the type information of the content protection method for determining whether the content received from the source device is output to the sink device from the repeater, based on the version of the content protection method supported by the sink device.

17 Claims, 9 Drawing Sheets

(56) References Cited

U.S. PATENT DOCUMENTS

| | | | |
|---|---|---|---|
| 2013/0055407 A1* | 2/2013 | Hirayama | H04N 21/4367 726/26 |
| 2013/0156186 A1* | 6/2013 | Candelore | H04N 7/1675 380/210 |
| 2013/0212613 A1* | 8/2013 | Velasco | H04N 21/25 725/25 |
| 2013/0230296 A1* | 9/2013 | Yun | G06F 21/606 386/230 |
| 2014/0211941 A1 | 7/2014 | Oh | |
| 2015/0020088 A1* | 1/2015 | Velasco | H04N 21/2343 725/25 |
| 2016/0021430 A1* | 1/2016 | LaBosco | H04N 21/4398 725/31 |
| 2016/0150180 A1* | 5/2016 | Kozuka | H04N 5/913 386/254 |
| 2016/0198198 A1* | 7/2016 | Iwami | H04N 21/2385 725/116 |
| 2016/0353425 A1* | 12/2016 | Iwami | H04N 21/436 |
| 2017/0070763 A1* | 3/2017 | Koo | H04N 21/266 |
| 2017/0094344 A1* | 3/2017 | Kozuka | H04N 21/43635 |

* cited by examiner

SOURCE DEVICE AND METHOD OF TRANSMITTING CONTENT

CROSS-REFERENCE TO RELATED APPLICATION

This application is based on and claims priority under 35 U.S.C. §119 to Korean Patent Application No. 10-2016-0046494, filed on Apr. 15, 2016, in the Korean Intellectual Property Office, and U.S. Provisional Patent Application Ser. No. 62/295,611 filed Feb. 16, 2016, the disclosures of which are incorporated by reference herein in their entireties.

BACKGROUND

1. Field

The present disclosure relates to source devices and methods of transmitting content, and for example, to methods of securely transmitting content from a source device.

2. Description of the Related Art

Content providers may prevent content from being duplicated without permission by applying a content protection method when providing content having a high-resolution such as an ultra high-definition (UHD) or a 4K resolution. The number of versions of content protection methods increases as techniques develop, and thus, there are many devices supporting various versions of content protection methods. Therefore, higher versions and lower versions of content protection methods are not compatible with each other.

SUMMARY

Source devices and methods of transmitting content are provided.

Additional aspects will be set forth in part in the description which follows and, in part, will be apparent from the description.

According to an aspect of an example embodiment, a source device transmitting content to a sink device from a repeater includes: a controller configured to check a version of a content protection method supported by the sink device from the repeater, to encrypt the content based on a version of the content protection method applied to the content, and to set a value of type information of the content protection method based on the version of the content protection method applied to the content and the version of the content protection method supported by the sink device, and communication circuitry configured to transmit the encrypted content and the type information of the content protection method to the repeater, wherein the type information of the content protection method is for determining whether the content received from the source device is output to the sink device from the repeater, based on the version of the content protection method supported by the sink device.

The controller may be configured to convert a resolution of the content by downscaling the content when a version of the content protection method applied to the content is a second version and the sink device may further support a first version lower than the second version.

The controller may be configured to set a value of the type information of the content protection method as a first value when a version of the content protection method applied to the content is a second version and the sink device may further support a first version lower than the second version, and the first value may indicate that the content, to which the first version or the second version is applied, may be output from the repeater.

The controller may further be configured to check the version of the content protection method supported by the sink device based on a register value of the repeater.

The controller may further be configured to determine the number of devices connected to the repeater, and may convert a resolution of the content by downscaling the content and set a value of the type information of the content protection method as a first value, when it is determined that the number of devices connected to the repeater is plural, wherein the first value may indicate that the content, to which the first version or the second version is applied, may be output from the repeater.

The controller may further be configured to determine the number of devices connected to the repeater based on a value of DEVICE_COUNT information of the repeater.

The content protection method may include high-bandwidth digital content protection (HDCP).

The controller may further be configured to generate a message that the content is converted when the content is converted, and may transmit the generated message to the sink device to be displayed on the sink device.

According to an aspect of another example embodiment, a method of transmitting content to a sink device from a repeater includes checking a version of a content protection method supported by the sink device from the repeater, encrypting the content based on a version of the content protection method applied to the content, setting a value of type information of the content protection method, based on the version of the content protection method applied to the content and the version of the content protection method supported by the sink device, and transmitting the encrypted content and the type information of the content protection method to the repeater, wherein the type information of the content protection method may be used for determining whether the content received from the source device is output to the sink device from the repeater, based on the version of the content protection method supported by the sink device.

The encrypting of the content may include converting a resolution of the content by downscaling the content when a version of the content protection method applied to the content is a second version and the sink device supports a first version lower than the second version.

The setting of the value of the type information of the content protection method may include setting a value of the type information of the content protection method as a first value when a version of the content protection method applied to the content is a second version and the sink device supports a first version lower than the second version, wherein the first value may indicate that the content, to which the first version or the second version is applied, may be output from the repeater.

The checking of the version of the content protection method supported by the sink device may include checking the version of the content protection method supported by the sink device based on a register value of the repeater.

The method of transmitting content to a sink device from a repeater may further include determining the number of devices connected to the repeater, and the encrypting of the content and the setting of a value of the type information of the content protection method may further include converting a resolution of the content by downscaling the content when it is determined that the number of devices connected to the repeater is plural, and setting a value of the type information of the content protection method as a first value, wherein the first value may indicate that the content, to which the first version or the second version is applied, may be output from the repeater.

The determining of the number of devices connected to the repeater may include determining the number of devices connected to the repeater based on a value of DEVICE_COUNT information of the repeater.

The method of transmitting content to a sink device from a repeater may further include generating a message that the content is converted when the content is converted, and transmitting the generated message to the sink device to be displayed on the sink device.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. In addition, descriptions of well-known functions and constructions will be omitted for clarity and conciseness, and similar reference numerals are assigned to similar elements throughout the specification.

Furthermore, the terms used in this disclosure will only be used for the purpose of describing particular embodiments, and are not used with the intent to limit the present disclosure. As used herein, the singular forms "a", "an", and "the" are intended to include the plural forms as well, unless the context clearly indicates otherwise. Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it may not exclude other elements but may further include the other elements unless specifically oppositely indicated.

Some embodiments of the present disclosure may be represented by the functional block configurations and various processing steps. Some or all of these functional blocks may be implemented in hardware and/or software configuration of the various number of executing a particular function.

Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device.

Hereinafter, the present disclosure will be described in detail with reference to the accompanying drawings.

Figure 1:
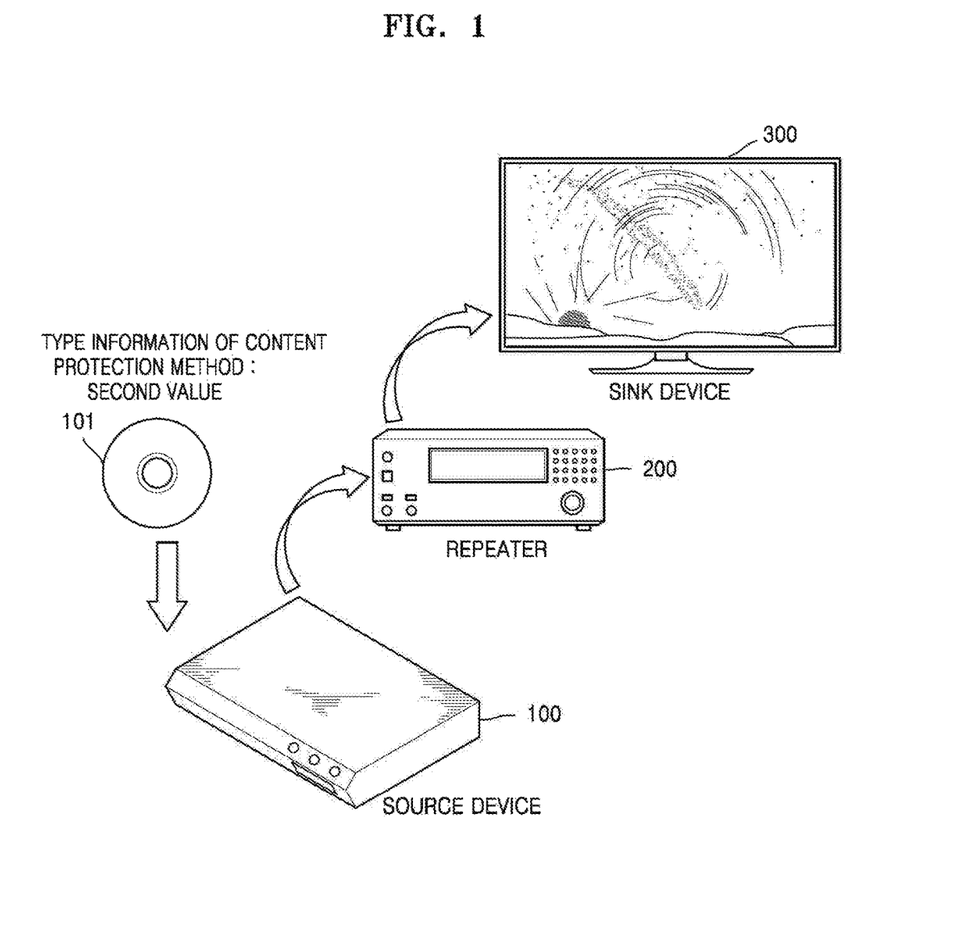
FIG. 1 is a diagram illustrating an example content providing system capable of employing a method of transmitting content, according to an example embodiment.

FIG. 1 is a diagram illustrating an example content providing system capable of employing a method of transmitting content, according to an example embodiment.

As illustrated in FIG. 1, a source device 100 may transmit content 101 to a sink device 300 from a repeater 200 connected to the source device 100.

The source device 100 may provide the content 101. The source device 100 may be a digital versatile disk (DVD) player, a Blu-ray player, or a game machine, but is not limited thereto, and may be realized as various types of electronic devices capable of transmitting content to the sink device 300. For example, the source device 100 may be realized as various electronic devices such as a mobile phone, a tablet computer, a digital camera, a camcorder, a laptop computer, a desktop computer, a terminal for digital broadcasting, a personal digital assistant (PDA), a portable multimedia player (PMA), a navigation device, or a wearable device.

Content may be the content 101 written to an optical disk such as a DVD or a Blu-ray disk, as illustrated in FIG. 1. Alternatively, content may be received from an external recording medium such as a universal serial bus (USB) memory or a hard disk drive (HDD), or on-line, but is not limited thereto.

The repeater 200 may be any device transmitting content received from the source device 100 to another repeater or the sink device 300. For example, the repeater 200 may be an audio-video (AV) receiver, but is not limited thereto.

The sink device 300 may be a device outputting content received from the source device 100. The sink device 300 may be a television (TV), a desktop computer, a laptop computer, a mobile phone, or a tablet computer, but is not limited thereto, may be realized as various types of electronic devices capable of outputting content.

The source device 100, the repeater 200, and the sink device 300 may use various interfacing methods to transmit content. For example, the source device 100, the repeater 200, and the sink device 300 may transmit content by using a high-speed multimedia Interface (HDMI). Furthermore, the source device 100, to prevent content from being duplicated without permission, may encrypt content by using a content protection method and may transmit the encrypted content to the repeater 200. For example, devices supporting the HDMI may support a high-bandwidth content protection (HDCP) to prevent content from being duplicated without permission.

The HDCP refers, for example, to a content protection method of preventing content from being duplicated without permission by encrypting content data received from the source device 100. The number of versions of HDCP increases as content protection method develops over time. Therefore, there are many devices supporting various versions of HDCP, and thus, devices supporting different versions of HDCP may not be compatible with each other.

Referring to FIG. 1, the source device 100 may transmit content by applying various content protection methods including HDCP. Content may be the content 101 written to an optical disk such as a DVD or a Blu-ray disk, as illustrated in FIG. 1. Furthermore, content may be received from an external recording medium such as a USB memory or an HDD, or on-line, but is not limited thereto.

Moreover, versions of a content protection method supported by a plurality of devices may be different from each other. For example, as illustrated in FIG. 1, the source device 100 and the repeater 200 may support a second version, and the sink device 300 may support a first version. The second version may be a higher version than the first version. Furthermore, type information of the content protection method may be used when versions of a content protection method supported by each device are different from each other resulting in the versions not being compatible with each other.

A content manufacturer may set a value of the type information of the content protection method based on various references including a priority level of content. For example, when a value of type information of a content protection method is a first value, content may be transmitted by applying a first version or a second version. However, when a value of type information of a content protection method is a second value, content may be transmitted by applying a second version. Therefore, as illustrated in FIG. 1, when the sink device 300 does not support the second version even if a value of type information of a content protection method is a second value, the sink device 300 may not output the content 101. As a result, even if the content 101 is legally distributed by a content manufacturer, a user cannot see the content 101 in the sink device 300. Therefore, a method of outputting content is required in which a value of type information of a content protection method is a second value, even when the sink device 300 does not support a content protection method of a second version.

According to an example embodiment, the source device 100 may encrypt and transmit content to the sink device 300 from the repeater 200 by considering a version of a content protection method supported by the sink device 300. Therefore, even when the version of the content protection method supported by the sink device 300 is lower than a version of a content protection method applied to content, content may be output from the sink device 300.

Figure 2:
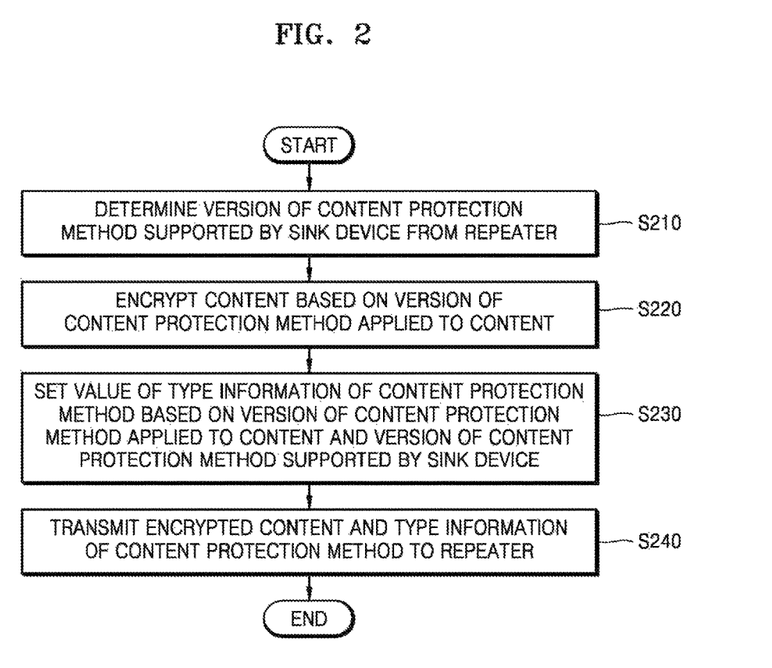
FIG. 2 is a flowchart illustrating an example method of transmitting content, according to an example embodiment.

FIG. 2 is a flowchart illustrating an example method of transmitting content, according to an example embodiment.

In operation S210, the source device 100 may check a version of a content protection method supported by the sink device 300 from the repeater 200. The source device 100, based on a specific register value of the repeater 200, may check a version of a content protection method supported by the sink device 300. For example, when the content protection method is HDCP, the source device 100, based on an RxInfo register value of the repeater 200, may check a version of the HDCP supported by the sink device 300.

In operation S220, the source device 100 may encrypt content based on a version of a content protection method applied to the content.

When a version of a content protection method supported by the device 100 and the repeater 200 is a second version, and when a version of the content protection method supported by the device is a first version, a version of the content protection method applied to content may be a second version. For example, when a value of type information of a content protection method is a second value, content needs to be transmitted to the sink device 300 supporting a second version. Therefore, content needs to be encrypted according to the second version, and needs to be transmitted to the sink device 300 supporting the second version. When content is encrypted according to the second version, the source device 100 may convert a resolution of the content by downscaling the content, and may encrypt the content having the converted resolution according to the second version.

In operation S230, the source device 100, based on the version of the content protection method applied to the content and the version of the content protection method supported by the sink device 300, may set a value of type information of the content protection method.

The source device 100, when the version of the content protection method applied to the content is a higher version than the version of the content protection method supported by the sink device 300, may change a value of type information of the content protection method. For example, the version applied to the content may be a second version and the sink device 300 may support a first version. Then, the source device 100 may change the value of type information of the content protection method to a first value so that the content may be transmitted to the sink device 300 supporting the first version. When the value of type information of the content protection method changes to the first value, the content may be encrypted according to a lower version (for example, a first version) of the content protection method in the repeater 200, and may be transmitted to the sink device 300 supporting the lower version.

In operation S240, the source device 100 may transmit the encrypted content and the type information of the content protection method to the repeater 200.

As described above, the source device 100, based on the version of the content protection method applied to the content and the version of the content protection method supported by the sink device 300, may set a value of the type information of the content protection method. Furthermore, the repeater 200, according to a version supported by the sink device 300, may encrypt the content received from the source device 100. Therefore, the source device 100 may allow a user see the content via the sink device 300 even when the sink device 300 does not support a second version.

Figure 3:
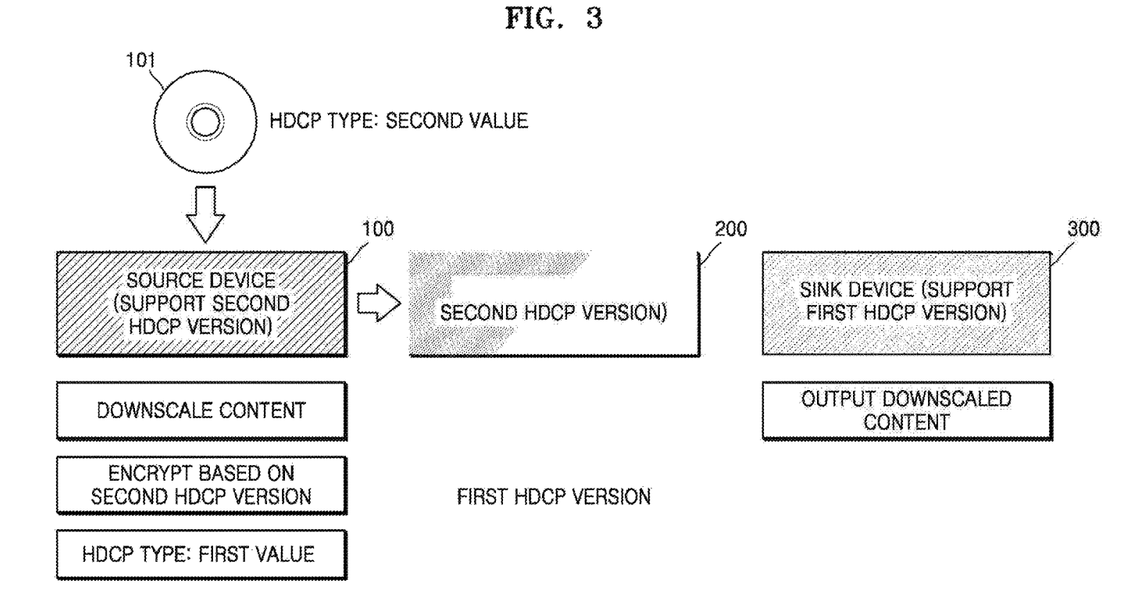
FIG. 3 is explaining diagram illustrating an example of transmitting of content from a source device, according to an example embodiment.

FIG. 3 is a diagram illustrating an example of transmitting of content from a source device, according to an example embodiment.

Hereinafter, for convenience of description, it will be described that a content protection method is, for example, HDCP. When a content protection method is HDCP, HDCP type information may correspond to type information of the content protection method, and first and second HDCP versions may correspond to first and second versions of the content protection method, respectively. For example, a second HDCP version may be HDCP 2.2 and a first HDCP version may be a lower version of the HDCP 2.2, but are not limited thereto.

The HDCP type information indicates whether content needs to be transmitted to the sink device 300 supporting the second HDCP version or may be transmitted to the sink device 300 supporting the first HDCP version.

For example, when a value of the HDCP type information is a first value, content may be transmitted to the sink device 300 supporting the second HDCP version or the first HDCP version. Therefore, content may be encrypted according to the second HDCP version or the first HDCP version (for example, a lower version than HDCP 2.2) in a repeater, and may be transmitted to the sink device 300 supporting the second HDCP version or the first HDCP version. However, when a value of the HDCP type information is a second value, content needs to be transmitted to the sink device 300 supporting the second HDCP version. Therefore, content needs to be encrypted according to the second HDCP version in the repeater 200, and needs to be transmitted to the sink device 300 supporting the second HDCP version. For example, the first value may be 0x00 and the second value may be 0x01, but are not limited thereto.

As illustrated in FIG. 3, the content 101, in which a value of the HDCP type information is set as a second value, may be transmitted to the sink device 300 from the repeater 200. Furthermore, the source device 100 and the repeater 200 may support the second HDCP version, and the sink device 300 may support the first HDCP version. In order to output the content 101 from the sink device 300, a process of converting a resolution of the content 101 and changing a value of the HDCP type information may be required.

The source device 100 may check a version of the HDCP supported by the sink device 300 from the repeater 200. For example, the source device 100 may check a version of the HDCP supported by the sink device 300, based on an RxInfo register value of the repeater 200. The source device 100 may read the RxInfo register value from the repeater 200 when an operation related to the HDCP starts.

As illustrated in FIG. 3, when a version of the HDCP supported by the sink device 300 is a first HDCP version, the source device 100 may convert a resolution of content by downscaling the content. For example, the source device 100 may downscale content so that a resolution of the content may become high definition (HD) from ultra high-definition (UHD). A process of converting a resolution of content will be described later below with reference to FIG. 4.

Furthermore, the source device 100 may encrypt the content having the converted resolution according to the second HDCP version. Since the source device 100 and repeater 200 support the second HDCP version, the source device 100 may more safely transmit content to the repeater 200 by encrypting the content according to the second HDCP version.

The source device 100 may set a value of the HDCP type information based on versions of HDCP applied to content and HDCP supported by the sink device 300. Referring to FIG. 3, since the value of the HDCP type information is a second value, content needs to be transmitted to the sink device 300 supporting the second HDCP version. However, the source device 100 changes the value of the HDCP type information to a first value since the sink device 300 does not support the second HDCP version. Furthermore, the source device 100 may transmit encrypted content and changed HDCP type information to the repeater 200.

The repeater 200 may decrypt the encrypted content received from the source device 100 according to the second HDCP version. Furthermore, the repeater 200 may encrypt the decrypted content according to the first HDCP version. Since the value of the HDCP type information is changed to the first value, the repeater 200 may encrypt content according to the first HDCP version and may transmit the encrypted content to the sink device 300.

The sink device 300 may decrypt the encrypted content received from the repeater 200 according to the first HDCP version. Furthermore, the sink device 300 may output the downscaled content. Therefore, the source device 100 may allow a user see the downscaled content via the sink device 300 even when the sink device 300 does not support the second HDCP version.

Figure 4:
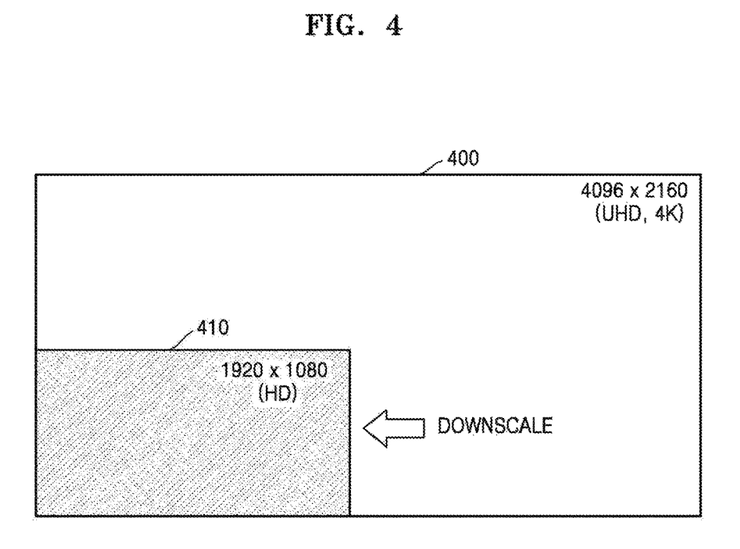
FIG. 4 is a diagram illustrating an example process of converting a resolution of content, according to an example embodiment.

FIG. 4 is a diagram illustrating an example process of converting a resolution of content, according to an example embodiment.

When the sink device 300 does not support a second version of a content protection method, the source device 100 may change a value of type information of the content protection method so that content may be output to the sink device 300 supporting a first version, that is, a lower version. Furthermore, the source device 100 may convert a resolution of content by downscaling the content. Therefore, a user may see the downscaled content in the sink device 300 even if the sink device 300 does not support the second version of the content protection method.

For example, referring to FIG. 4, the source device 100 may downscale content of a resolution 400 of 4096×2160 (UHD) to content of a resolution 410 of 1920×1080 (HD), but the disclosure is not limited thereto. As methods of downscaling content are commonly known to those of ordinary skill in the art, a detailed description thereof will not be given here.

Figure 5A:
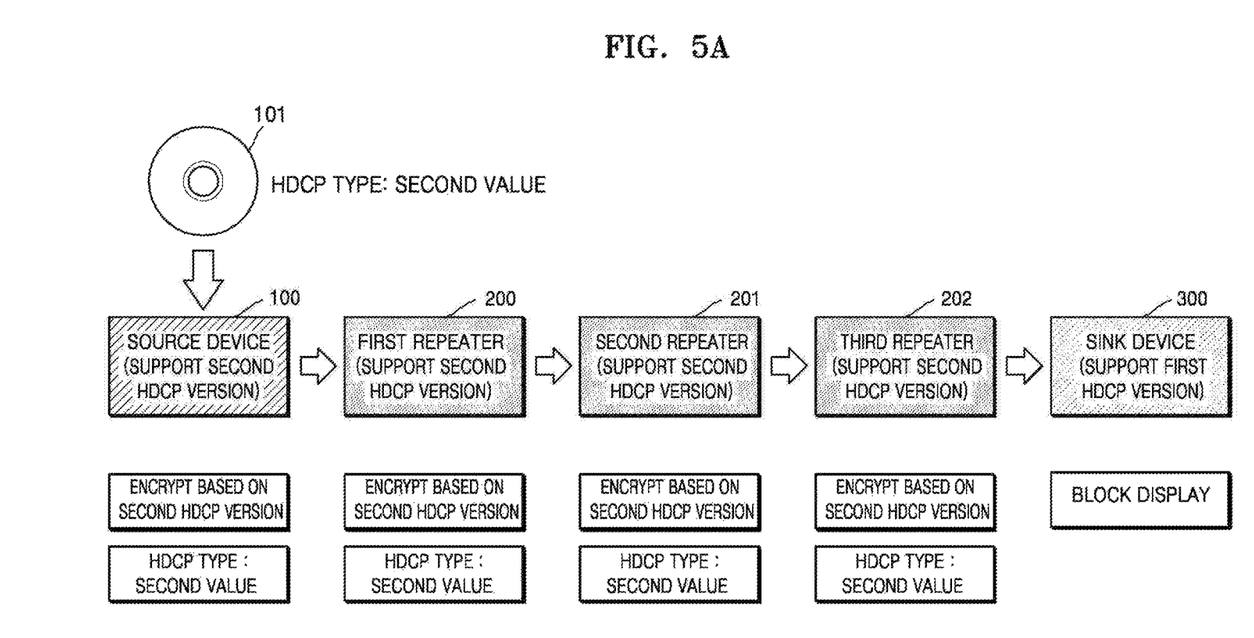
FIGS. 5A and 5B are diagrams illustrating an example method of transmitting content from a source device through a plurality of repeaters, according to an example embodiment.
Figure 5B:
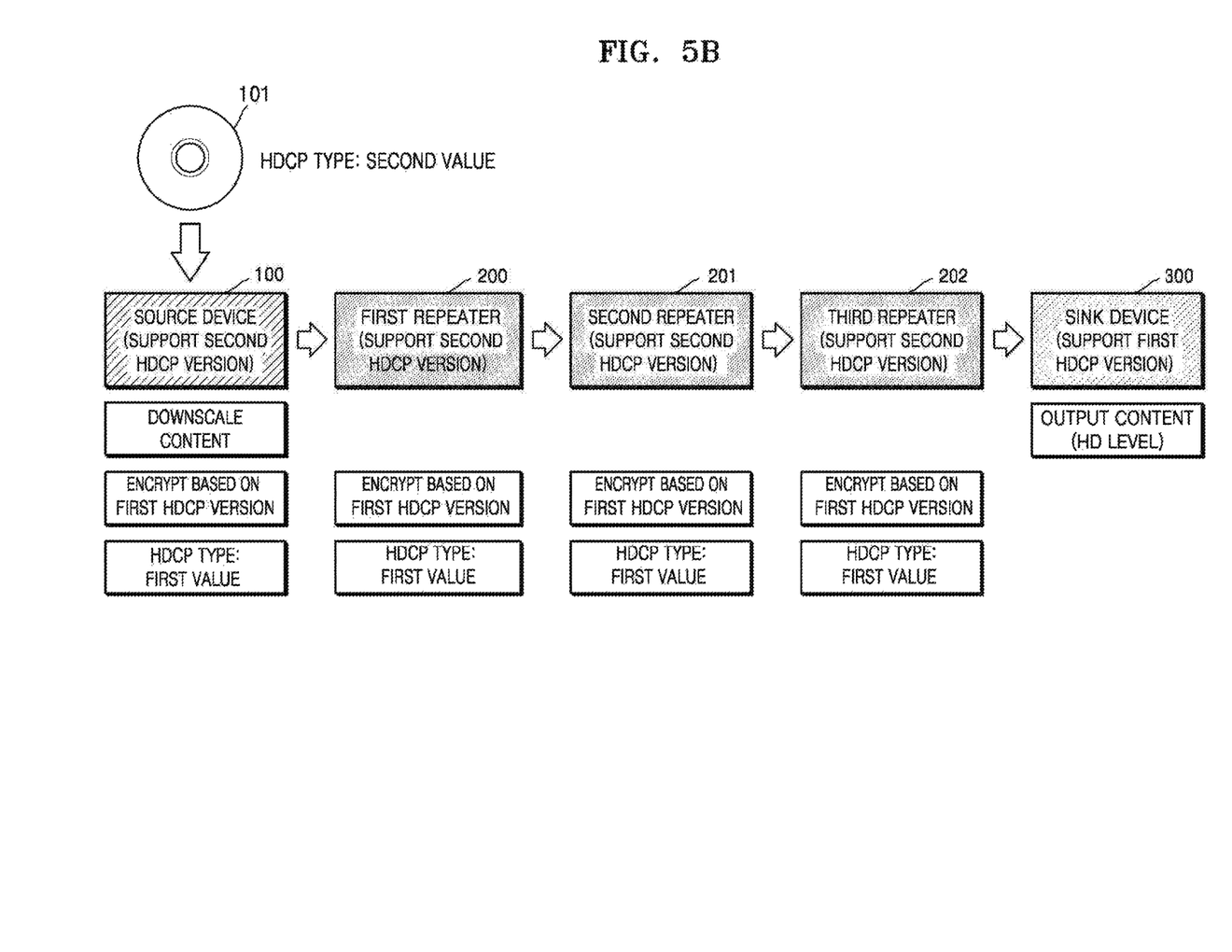

FIGS. 5A and 5B are diagrams illustrating an example method of transmitting content from a source device through a plurality of repeaters, according to an example embodiment.

Hereinafter, for convenience of description, it will be described that a content protection method is, for example, HDCP.

As illustrated in FIG. 3, the repeater 200 may be connected between the source device 100 and the sink device 300. Accordingly, the source device 100 may check a version of the HDCP supported by the sink device 300 from the repeater 200.

However, as illustrated in FIG. 5A, when a plurality of repeaters (for example, first to third repeaters 200 to 202) are connected between the source device 100 and the sink device 300, it is difficult for the source device 100 to check a version of the HDCP supported by the sink device 300. Therefore, it is difficult for the source device 100 to change a value of the HDCP type information based on versions of the HDCP applied to the content 101 and the HDCP supported by the sink device 300. Furthermore, when the sink device 300 supports a first HDCP version, it is difficult to output the content 101 from the sink device 300 if the value of the HDCP type information is a second value.

Referring to FIG. 5A, the source device 100 may not check a version of the HDCP supported by the sink device 300. Instead, the source device 100 may check a version of the HDCP supported by the second repeater 201 from the repeater 200. Since the second repeater 201 supports a second HDCP version and the value of the HDCP type information is the second value, the source device 100 does not downscale the content 101. Furthermore, the source device 100 may encrypt the content 101 according to the second HDCP version. The value of the HDCP type information may be maintained as the second value. The encrypted content according to the second HDCP version and the HDCP type information may be transmitted from the source device 100 to the first repeater 200. The first repeater 200 may transmit the encrypted content and the HDCP type information to the second repeater 201 while the second repeater 201 transmits the encrypted content and the HDCP type information to the third repeater 202. However, since the sink device 300 does not support the second HDCP version and a value of the HDCP type information is the second value, the third repeater 202 may not transmit content to the sink device 300. Therefore, even when the first to third repeaters 200 to 202 are connected between the source device 100 and the sink device 300, required is a method of outputting content from the sink device 300.

The source device 100 may determine the number of devices connected to the first repeater 200. For example, the source device 100 may determine the number of devices connected to the first repeater 200 from a value of DEVICE_COUNT information of the first repeater 200. If it is determined that the number of devices connected to the first repeater 200 is plural, the source device 100 may downscale content without considering a version of the HDCP supported by the sink device 300.

Referring to FIG. 5B, the first repeater 200 is also connected to the second and third repeaters 201 and 202 as well as the source device 100 and the sink device 300. The source device 100 may determine that the number of devices connected to the first repeater 200 is four from the value of the device count information of the first repeater 200. Therefore, the source device 100 may downscale the content 101 without considering a version of the HDCP supported by the sink device 300. Furthermore, the source device 100 may change a value of HDCP type information of the content 101 to a first value. Furthermore, the source device 100 may encrypt the downscaled content according to the first HDCP version.

When the plurality of repeaters 200 to 202 are connected between the source device 100 and the sink device 300, it is difficult for the source device 100 to transmit the content 101 by considering a version of the HDCP supported by the sink device 300. Therefore, source device 100 may downscale the content 101 regardless of a version of the HDCP supported by the sink device 300. Furthermore, the source device 100 may encrypt the downscaled content according to the first HDCP version, and may transmit the encrypted content. Therefore, the content 101 may be output from the sink device 300 regardless of a version of the HDCP supported by the sink device 300.

However, according to an example embodiment, even when a repeater is connected between the source device 100 and the sink device 300, the source device 100 may downscale the content 101 regardless of a version of the HDCP supported by the sink device 300. Furthermore, the source device 100 may encrypt the downscaled content according to the first HDCP version, and may transmit the encrypted content to the sink device 300.

Figure 6:
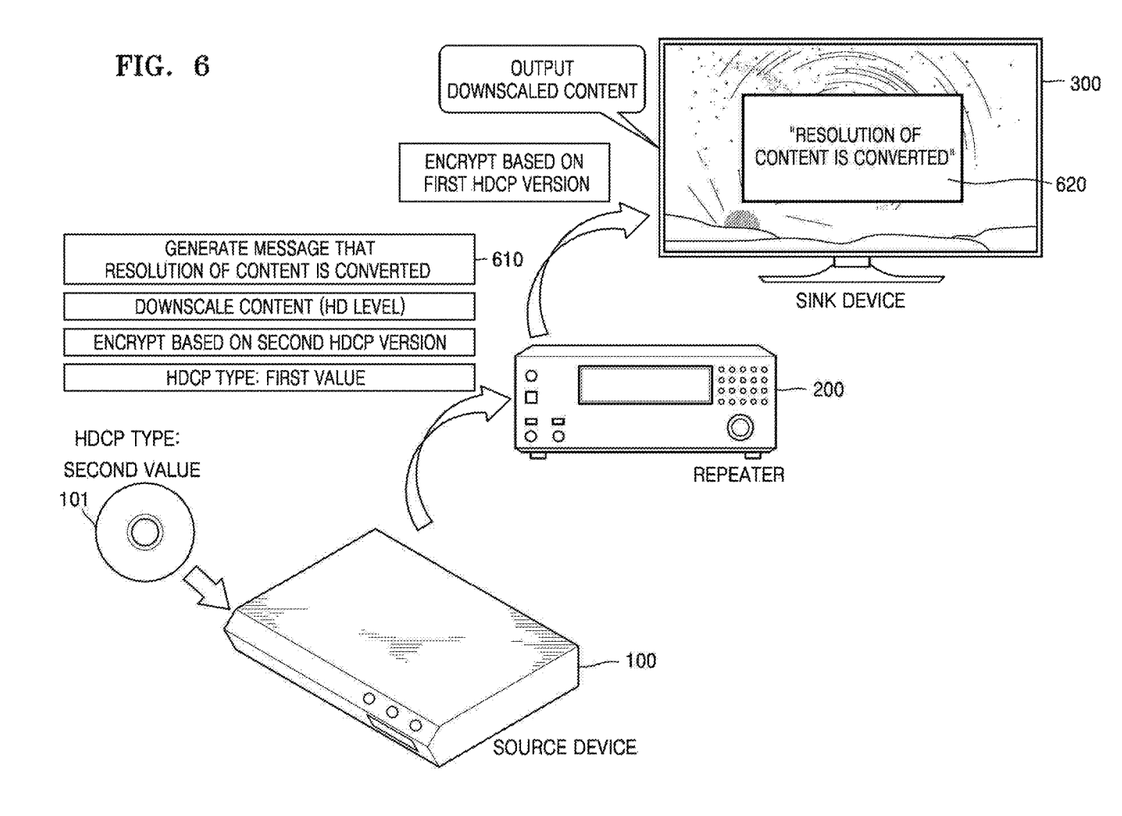
FIG. 6 is diagram illustrating an example source device generating a message that content is converted, according to an example embodiment.

FIG. 6 is a diagram illustrating an example of the source device 100 generating a message that content is converted, according to an example embodiment.

When the content 101 is downscaled and output from the sink device 300, it may be difficult for a user to recognize that a resolution of the content 101 is converted. For example, a user may not recognize whether the content 101 is output from the sink device 300 with a UHD resolution or downscaled and output with an HD resolution. Therefore, when the content 101 is downscaled and output from the sink device 300, the source device 100 may generate a message that a resolution of the content 101 is converted. The source device 100 may transmit the generated message to the sink device 300 to be displayed on the sink device 300.

Referring to FIG. 6, when the sink device 300 supports the first HDCP version, the source device 100 may downscale the content 101 and the sink device 300 may output the downscaled content. Here, the source device 100 may generate (610) a message representing that a resolution of the content 101 is converted, and may transmit the generated message to the sink device 300 to be displayed (610) on the same. Furthermore, the sink device 300 may display a message 620 received from the repeater 200. For example, as illustrated in FIG. 6, the sink device 300 may display the message 620 of "A resolution of content is converted", but is not limited thereto. Furthermore, as illustrated in FIG. 6, the message may be displayed in a form of a pop-up message, but the message may be displayed in various forms according to an embodiment.

Figure 7:
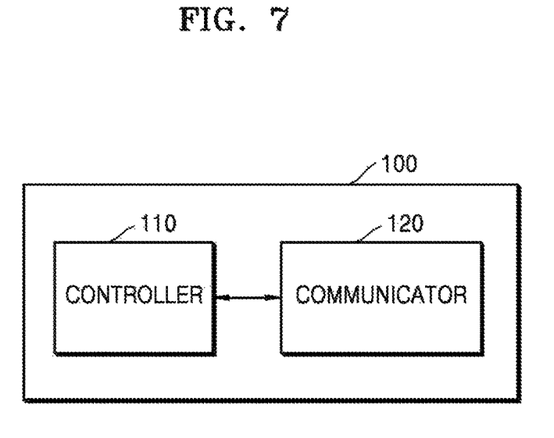
FIG. 7 is a block diagram illustrating an example configuration of a source device, according to an example embodiment.

FIG. 7 is a block diagram illustrating an example configuration of the source device 100, according to an example embodiment.

Referring to FIG. 7, the source device 100 may include a controller 110 and a communicator (e.g., including communication circuitry) 120. However, the number of components of the source device 100 may be greater or less than that illustrated in FIG. 10.

Hereinafter, the components will be sequentially described.

The controller 110 may check a version of a content protection method supported by the sink device 300, and may encrypt content based on a version of the content protection method applied to the content.

For example, when the content protection method is HDCP, the controller 110 may check a version of the HDCP supported by the sink device 300 based on an RxInfo register value of the repeater 200. The controller 110, when a version of the content protection method applied to the content is a second version and the sink device 300 supports a first version, may change a resolution of the content by downscaling the content. Furthermore, the controller 110 may encrypt the content having the converted resolution according to the second version.

The controller 110, based on the version of the content protection method applied to the content and the version of the content protection method supported by the sink device 300, may set a value of type information of the content protection method. The controller 110, when a version of the content protection method applied to the content is a second version and the sink device 300 supports a first version, may set a value of the type information of the content protection method as a first value. The first value indicates that content, to which the first version or the second version may be applied, may be output from a repeater.

Furthermore, the controller 110 may determine the number of devices connected to the repeater 200. For example, the controller 110 may determine the number of devices connected to the repeater 200 from a value of DEVICE_COUNT information of the repeater 200. If it is determined that the number of devices connected to the repeater 200 is plural, the controller 110 may convert a resolution of the content by downscaling the content. Furthermore, the controller 110 may encrypt the content having the converted resolution according to the first version and may set a value of the type information of the content protection method as a first value.

The controller 110 may generate a message representing that a resolution of the content is converted when the resolution of the content is converted, and may transmit the generated message to the sink device 300 to be displayed on the sink device 300.

The communicator 120 may include communication circuitry configured to transmit the content encrypted in the controller 110 and the type information of the content protection method to the repeater 200. Furthermore, the communicator 120 may include at least one component comprising communication circuitry so the source device 100 may communicate with an external device.

Figure 8:
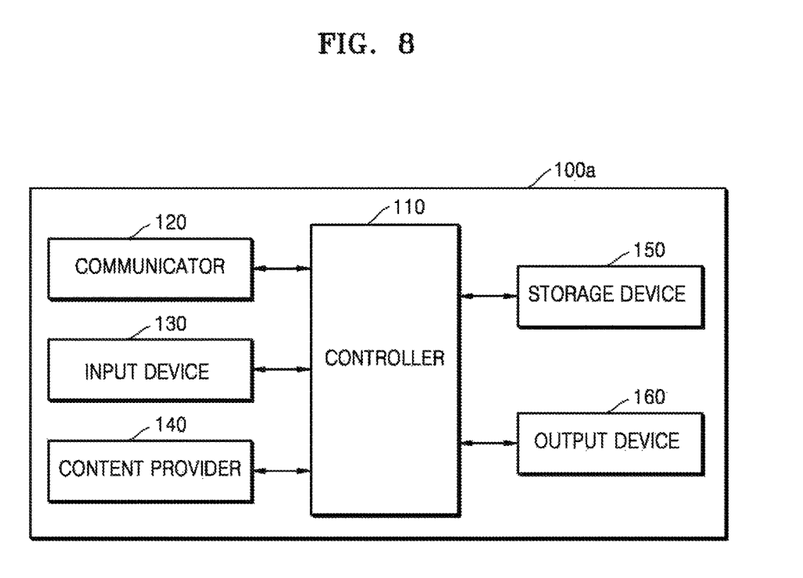
FIG. 8 is a block diagram illustrating an example configuration of a source device, according to another example embodiment.

FIG. 8 is a block diagram illustrating an example configuration of a source device 100a, according to another example embodiment.

As illustrated in FIG. 8, the source device 100a may further include an input device (e.g., including input circuitry) 130, a content provider 140, a storage device 150, and an output device (e.g., including output circuitry) 160 as well as the controller 110 and the communicator (e.g., including communication circuitry) 120.

Thus, repeated descriptions of the controller 110 and the communicator 120 will not be repeated for convenience of description.

The input device 130 includes, for example, input circuitry for inputting data for controlling the source device 100a by a user. For example, the input device 130 may input data for turning on/off the source device 100a, or data for reproducing content or for stopping the content, but the disclosure is not limited thereto.

For example, the input device 130 may include various input circuitry, such as, for example, and without limitation, a keypad, a dome switch, a touch pad (a contact capacitance type, a pressure resistance film type, an infrared sensing type, an ultrasonic transmission type in a surface, a integral tension measurement type, a piezoelectric effect type, etc.), a jog wheel, a jog switch and the like may be, but is not limited thereto. Furthermore, according to an example embodiment, the input device 130 may be a component of a controller including a remote control, or may be a component of the source device 100a.

The content provider 140 may provide content transmitted to the sink device 300, and may be realized in various forms according to an embodiment. For example, the content provider 140 may be realized in a form of including components such as a tuner (not shown), a demodulator (not shown), or an equalizer (not shown), and may receive content from a broadcasting station. Furthermore, the content provider 140 may read content from an optical disk such as a DVD or a Blu-ray disk. Furthermore, the content provider 140 may receive content from an external recording medium such as a USB memory or an HDD.

A storage device 150 may store a program for processing and controlling the processor 110, or may store the data input to or output from the mobile device 100a.

The storage device 150 may include at least one type of storage medium from among memory of a flash memory type, a hard disk type, a multimedia card micro type or a card type (for example, SD or XD memory), random access memory (RAM), static random access memory (SRAM), read-only memory (ROM), electrically erasable programmable read-only memory (EEPROM), programmable ROM (PROM), magnetic memory, a magnetic disk, or an optical disk.

According to an example embodiment, the storage device 150 may include a module including at least one instruction of checking a version of a content protection method supported by the sink device 300 from the repeater 200, encrypting the content according to a version of the content protection method applied to the content, setting a value of type information of the content protection method based on the version of the content protection method applied to the content and the version of the content protection method supported by the sink device 300, and transmitting the encrypted content and the type information of the content protection method to the repeater 200.

Meanwhile, the block diagrams of the source devices 100 and 100a illustrated in FIGS. 7 and 8 are example embodiments. Each component of the block diagram may be integrated, added, or omitted, depending on the specifications of the mobile device 100 and 100a is actually implemented. For example, combining two or more elements are in a single component, as needed, or may be one component configuration is subdivided into two or more components. In addition, the functions performed by the respective blocks are for purposes of describing the embodiments, that the specific operation and the device shall not limit the scope of the disclosure.

The disclosed example embodiments may be implemented as computer instructions which can be executed by various computer means, and recorded on a computer-readable medium. The computer-readable medium may include program commands, data files, data structures or a combination thereof. Program instructions recorded on the medium may be particularly designed and structured for the disclosure or available to those skilled in computer software. Examples of the computer-readable recording medium include magnetic media, such as a hard disk, a floppy disk, and a magnetic tape; optical media, such as a compact disk-read only memory (CD-ROM) and a digital versatile disc (DVD); magneto-optical media, such as floptical disks; a read-only memory (ROM); a random access memory (RAM); and a flash memory. Program commands may include, for example, a high-level language code that can be executed by a computer using an interpreter, as well as a machine language code made by a complier.

It should be understood that example embodiments described herein should be considered in a descriptive sense only and not for purposes of limitation. Descriptions of features or aspects within each example embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. A source device configured to transmit content to a sink device from a repeater, the source device comprising:
a controller configured to determine a version of a content protection method supported by the sink device from the repeater, to encrypt the content based on a version of the content protection method applied to the content, and to set a value of type information of the content protection method based on the version of the content protection method applied to the content and the version of the content protection method supported by the sink device; and a communicator comprising communication circuitry configured to transmit the encrypted content and the type information of the content protection method to the repeater, wherein the type information of the content protection method is for determining whether the content received from the source device is output to the sink device from the repeater, based on the version of the content protection method supported by the sink device.

2. The source device of claim 1, wherein the controller is further configured to convert a resolution of the content by downscaling the content when a version of the content protection method applied to the content is a second version and the sink device is further configured to support a first version lower than the second version.

3. The source device of claim 1, wherein the controller is further configured to set a value of the type information of the content protection method as a first value when a version of the content protection method applied to the content is a second version and the sink device is further configured to support a first version lower than the second version, and the first value indicates that the content, to which the first version or the second version is applied, is output from the repeater.

4. The source device of claim 1, wherein the controller is further configured to determine the version of the content protection method supported by the sink device based on a register value of the repeater.

5. The source device of claim 1, wherein the controller is further configured to determine the number of devices connected to the repeater, and to convert a resolution of the content by downscaling the content and to set a value of the type information of the content protection method as a first value, when it is determined that the number of devices connected to the repeater is more than one, wherein the first value indicates that the content, to which the first version or the second version is applied, is to be output from the repeater.

6. The source device of claim 5, wherein the controller is further configured to determine the number of devices connected to the repeater based on a value of DEVICE_COUNT information of the repeater.

7. The source device of claim 1, wherein the content protection method comprises high-bandwidth digital content protection (HDCP).

8. The source device of claim 1, wherein the controller is further configured to generate a message that the content is converted when the content is converted, and to transmit the generated message to the sink device to be displayed on the sink device.

9. A method of transmitting content to a sink device from a repeater, the method comprising:

determining a version of a content protection method supported by the sink device from the repeater;

encrypting the content based on a version of the content protection method applied to the content;

setting a value of type information of the content protection method, based on the version of the content protection method applied to the content and the version of the content protection method supported by the sink device; and transmitting the encrypted content and the type information of the content protection method to the repeater, wherein the type information of the content protection method is for determining whether the content received from the source device is output to the sink device from the repeater, based on the version of the content protection method supported by the sink device.

10. The method of claim 9, wherein the encrypting of the content comprises:

converting a resolution of the content by downscaling the content when a version of the content protection method applied to the content is a second version and the sink device supports a first version lower than the second version.

11. The method of claim 9, wherein the setting of the value of the type information of the content protection method comprises:

setting a value of the type information of the content protection method as a first value when a version of the content protection method applied to the content is a second version and the sink device supports a first version lower than the second version, wherein the first value indicates that the content, to which the first version or the second version is applied, is to be output from the repeater.

12. The method of claim 9, wherein the determining of the version of the content protection method supported by the sink device comprises:

determining the version of the content protection method supported by the sink device based on a register value of the repeater.

13. The method of claim 9, further comprising:

determining the number of devices connected to the repeater, and the encrypting of the content and the setting of a value of the type information of the content protection method further comprises:

converting a resolution of the content by downscaling the content when it is determined that the number of devices connected to the repeater is more than one; and setting a value of the type information of the content protection method as a first value, wherein the first value indicates that the content, to which the first version or the second version is applied, is to be output from the repeater.

14. The method of claim 13, wherein the determining of the number of devices connected to the repeater comprises:

determining the number of devices connected to the repeater based on a value of DEVICE_COUNT information of the repeater.

15. The method of claim 9, wherein the content protection method comprises high-bandwidth digital content protection (HDCP).

16. The method of claim 9, further comprising:

generating a message that the content is converted when the content is converted; and transmitting the generated message to the sink device to be displayed on the sink device.

17. A non-transitory computer-readable recording medium having recorded thereon a program for executing the method of transmitting content of claim 9.

* * * * *